Jan. 26, 1965 P. L. SHULTZ 3,167,129
CONSTRUCTION OF AIRFOILS HAVING ELASTICALLY-BENT AFTERBODIES
Filed May 16, 1962

Jan. 26, 1965   P. L. SHULTZ   3,167,129
CONSTRUCTION OF AIRFOILS HAVING ELASTICALLY-BENT AFTERBODIES
Filed May 16, 1962   3 Sheets-Sheet 3

United States Patent Office 3,167,129
Patented Jan. 26, 1965

3,167,129
CONSTRUCTION OF AIRFOILS HAVING
ELASTICALLY-BENT AFTERBODIES
Paul L. Shultz, Menominee, Mich., assignor to R. J. Enstrom Corporation, Menominee, Mich., a corporation of Michigan
Filed May 16, 1962, Ser. No. 195,076
4 Claims. (Cl. 170—159)

This invention relates to the construction of airfoils and in particular to helicopter rotor blades and other airfoils of relatively short chord as compared to span length.

Such short-chord airfoils, as are used for helicopter rotor blades, require chordwise balance near the 25 percent chord point; hence the aft blade structure must be light in weight, compared to the forward blade structure. Accordingly, it is customary to use a full-span heavy spar in the region of maximum airfoil thickness, to which air loads on the afterbody are transferred.

The problem of designing a light-weight airfoil afterbody may be met in various ways. Where very thin aft skins are used, these may be supported by ribs affixed to the aft side of the spar; or the entire afterbody may be filled with light-weight material adhered to the spar and skins. In some instances, skins have been employed which are thick enough of themselves to carry the load, without any support between the spar and the trailing edge. Such unsupported skins would be first bent and permanently "set" to afterbody configuration by plastic deformation of skin material. It is to be understood that the term "plastic deformation" is used in the structural engineering sense, meaning deformation beyond the elastic limit of the aluminum or other structural sheet material used; it does not mean the use of plastic.

Extremely thick plates will not normally be employed for helicopter blade afterbodies. Unsupported afterbody skins will usually be thin enough to permit a substantial amount of elastic bending, that is, bending without plastic deformation.

I have discovered how airfoil afterbody shape may be given to flat sheet material without permanently deforming and setting it to the afterbody curvature; and how such material may be used in airfoil afterbodies without filler material, intermediate ribs or skin "formers." This specification discloses the preferred constructions of airfoils which hold themselves elastically in the conformation of an airfoil afterbody; and also the preferred methods of making such constructions.

If a margin of structural sheet is elastically constrained at and held to a chosen curvature, such margin will have internal stresses which are a function of its curvature. If the opposite margin of the same sheet has similar edge constraint which imposes a similar curvature, and the sheet is held in equilibrium as between such edge constraints or "moments," the body of the sheet between its edges will experience similar stresses and curvature, each portion of the sheet transmitting the stresses to the adjacent portions.

If instead of a single sheet there be two sheets joined to each other at a converging trailing edge angle and the joint is sufficiently rigid to transmit such stresses, and if no forces be applied other than the forces tending to cause edge curvature, both sheets will tend to assume constant curvature between such restrained edges. Thus, the curvature of the airfoil contour at the region of maximum thickness, if imposed on sheets extending rearwardly to a trailing edge joint, would tend to continue toward and around the trailing edge, from the upper sheet forward margin to the lower sheet forward margin.

If in addition to imposing curvature on the edges of such sheets, the juncture of the upper and lower sheets at the trailing edge be pressed together, and the force of pressing together be resisted along the forward margins, there will be relieving "moment" increasing toward the trailing edge; this will give rise to a tendency to lessen the convex curvature progressively as the trailing edge is approached. A somewhat similar relief of convex curvature would occur if the trailing edge juncture was less rigid in bending than the sheet material itself.

The present invention consists of airfoil constructions and methods wherein, generally stated, upper and lower aft skins are adhered, by their forward margins, conformingly to upper and lower airfoil-contoured faces on the spar, while angularly-converging aft margins of the sheets are pressed together and secured. The constraints thus imposed on the forward and rear sheet margins hold the skins elastically to the conformation of an airfoil afterbody. Airfoils so made may be symmetrical or unsymmetrical and may be substantially twisted along their spans.

Preferred embodiments of the invention, as well as some of the principles involved, are discussed in greater detail hereinafter and illustrated in the accompanying drawings, in which.

Figure 2:
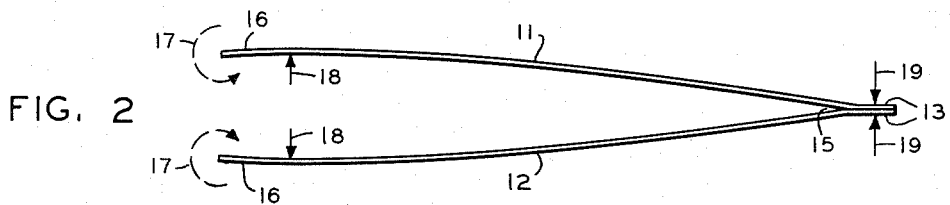
FIGURE 2 is a schematic view illustrating how marginal constraints imposed on the aft skins of FIGURE 1 will bend them elastically to the shape of an airfoil afterbody.
Figure 3:
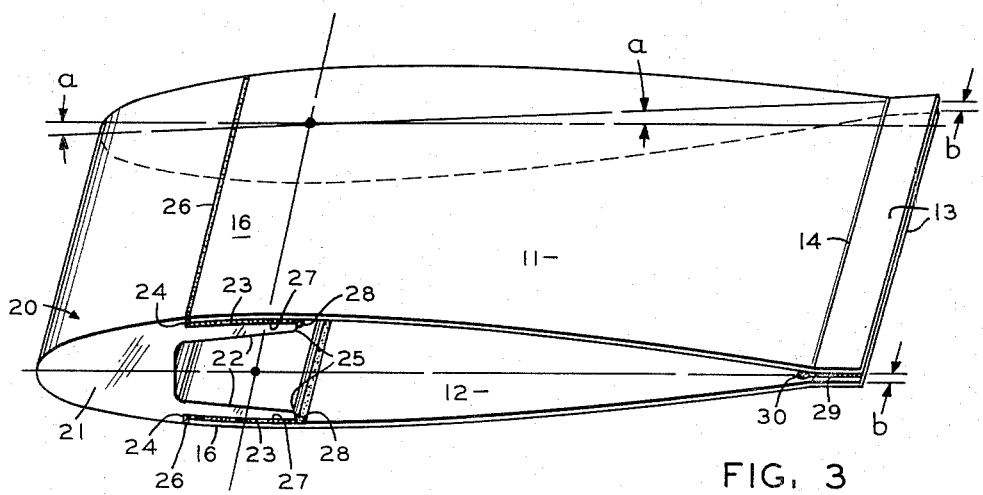
FIGURE 3 is a perspective view of a segment of a symmetrical helicopter rotor blade whose afterbody consists of such elastically bent skins.

In forming the embodiment illustrated in FIGURE 3, a complete one-piece afterbody skin and a similar lower afterbody skin are preliminarily cut from flat structural sheet material, such as clad aluminum alloy sheet. For use with a typical helicopter for carrying between two and four passengers, such flat sheet, say .040 inch thick, will bend elastically (that is, without permanent deformation or "set") to afterbody shape, and yet be firm enough to carry air loads forward to the spar without excessive distortion of airfoil shape. Such a one-piece upper skin 11 and lower skin 12 have rear margins 13 demarked forwardly by a permanently set angular bend 14 which, for a symmetrical airfoil, will be equal in each sheet. The airfoil trailing edge line will demark the rearward edges of the margins 13; the sum of the two angular bends 14 will provide a converging angular juncture 15 between the upper and lower skins 11, 12, as shown in FIGURE 2.

In the present invention, no permanent "set" is imparted to the skins 11, 12, other than the permanently set angular bends 14. Afterbody shape is given solely by margin constraints, as illustrated in FIGURE 2. Such margin constraints consist, along the forward margins 16 of each of the skins 11, 12, of edge moments denoted by the moment vectors 17, tending to impose convex curvature on the skins 11, 12; also of outward-exerted spreading forces, shown by the force vectors 18, which react the inward acting force vectors 19 shown at the rear margins 13 to be adhered together. These are illustrated as balanced against each other. No attempt has been made to illustrate the internal stresses within the skins 10, 11 which curve them; nor the manner in which the moment of such curving stresses is transferred through the joining of the rear margins.

A typical segment of a symmetrical twisted rotor blade made under this invention is shown in FIGURE 3. The segment is entirely hollow; it has no ribs or skin formers. FIGURE 3 is representative of the blade construction along the entire blade span from its root retention fitting and closure to its tip closure; these may be of usual types and are not part of the present invention. Between them, the only essential blade parts are the spar 20, the afterbody skins 10, 11, and their adhesive joints.

The spar generally designated 20 is formed by extruding aluminum alloy and cutting off to suitable length. The spar may have a solid leading edge portion 21, whose mass lies sufficiently far forward so that the center of gravity of the blade will be at approximately 25 percent chord line. Formed integrally with the leading edge portion 21, the spar 20 has upper and lower aft-extending spar arm portions 22, each arm portion having an outer adhesion face 23 recessed from and contoured parallel to the air-foil mold line (the outer contour of the airfoil), the recessing being sufficient to accommodate the thickness of the upper and lower skins 11, 12 respectively, against the upper and lower adhesion faces 23. The adhesion faces 23 are demarked forwardly by aft-presented shoulders 24 of the spar 20; the arm portions 22 terminate aft in spreader ends 25 near the maximum thickness region of the airfoil, which apply the outwardly exerted force vectors 18 shown in FIGURE 2.

Between the spar shoulders 24 and its spreader ends 25, the adhesion faces 23 are carefully contoured parallel to the airfoil mold line. The contour to which the forward skin margins 16 will be conformed is therefore the curvature of the airfoil surface at substantially its maximum thickness portion. From this portion back to the permanently-set angular bends 14, the convex curvature of the upper and lower skins 11, 12 lessens gradually. The outward forces (indicated by the forward force vectors 18) resisted at the trailing edge by the inward forces (indicated by vectors 19) which accompany adhesion as hereinafter described, provide a somewhat off-setting curvature, that is, a tendency towards concave curvature which tendency increases toward the trailing edge.

When completed in the bonding fixture hereinafter to be described, the inner surfaces of the forward margins 16 are adhered to the contoured adhesion faces 23, held apart by the spreader ends 25; while the forward edges of the forward margins 16 are adhered to the aft presented shoulders 24 of the spar. Adherence is accomplished by a joint of rigid adhesive, preferably set under heat and pressure, such as an epoxy resin adhesive. At the forward margins 16, such an adhesive bond will somewhat resemble a flanged ribbon of cured adhesive, including a forward shear bond portion 26 to the aft-presented shoulders 24, a contoured bond area 27 between the upper and lower adhesion faces 23 and the inner surfaces of the forward margins 16; and a fillet 28 of adhesive material extending along and adhering the spreader ends 25 to the inner surface of the sheet 11 immediately aft of the forward margins 16. Such an adhesive bond has proved to be adequate to constrain the forward margins 16 elastically stressed from flat to contour-conforming alignment with the recessed faces 23.

Along the rear margins 13 aft of the permanently-set angular bends 14, the upper and lower sheets 11, 12 are adhered together in flatwise contact by a ribbon-like band of adhesive material 29, which includes at its forward edge an adhesive fillet 30 in the angular juncture 14.

The adhered-together rear margins 13 form a cusp-like trailing edge juncture which is aerodynamically acceptable or even desirable, in that it permits a slightly farther aft center of gravity than the ordinary 25 percent location normally sought. Its width provides adequate area for rigid adherence of, and load transfer between, the margins 13.

If the rotor blade is to be twisted (as to provide a lesser angle at the tip) the spar 20 may be first twisted to "set" it at the twist angle $a$. The skins 11, 12, flat except for their angularly "set" rear margins 13, are fitted with their forward edges against the shoulders 24 of such a twisted spar. When the forward margins 16 are adhered to the recessed contoured faces 23 in contour-conforming and twist-conforming alignment, and the rear margins 13 pressed together, a small spanwise offset $b$ of the rear margins 13 will result along the trailing edge. This has proved to offer no difficulty; the offset $b$ follows automatically from slippage of the surfaces being adhered prior to the setting of the adhesive; and the margin constraints imposed in the adhesive bonding fixture (hereafter described) will be continued by the "setting" of the adhesive, so that the twisted shape is preserved. In addition to the offset $b$ it might be predicted theoretically that the rear margins would assume a slight angle relative to each other. This too has proved to offer no problem; to whatever extent it occurs, it is "set" by adhesion, and irregularities are readily trimmed off.

Figure 1:
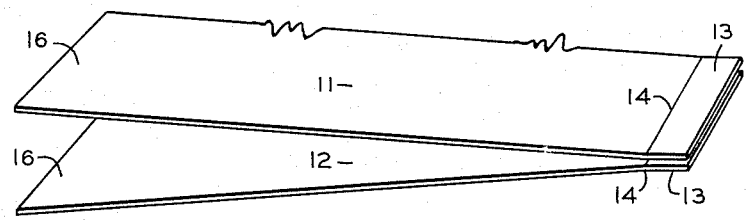
FIGURE 1 is a perspective view of upper and lower afterbody skins, preliminarily prepared by bending their rear margins to a permanently set angle.
Figure 7:
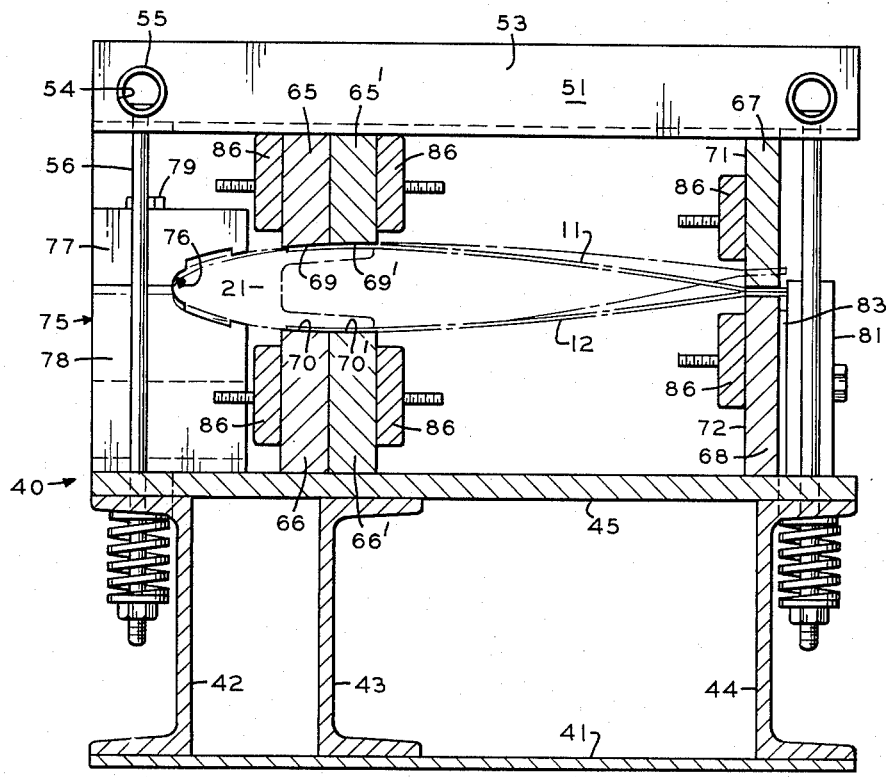
FIGURE 7 is a typical sectional view, taken along line 7—7 of FIGURE 6.

FIGURE 7 shows, in section, a suitable bonding fixture generally designated 40 holding the parts of a rotor blade such as that of FIGURE 3. The phantom lines indicate the twist of the blade at another section, with the spanwise variation in the otherwise straight-line elements of the fixture 40 to achieve twist. While the skins 11 and 12 are here shown in finished after-body conformation, it is understood that their conformation is entirely elastic. If adhesion were not effected, upon removal from the fixture 40, the skins 11, 12 would spring back to their flat shape as shown in FIGURE 1.

Figure 5:
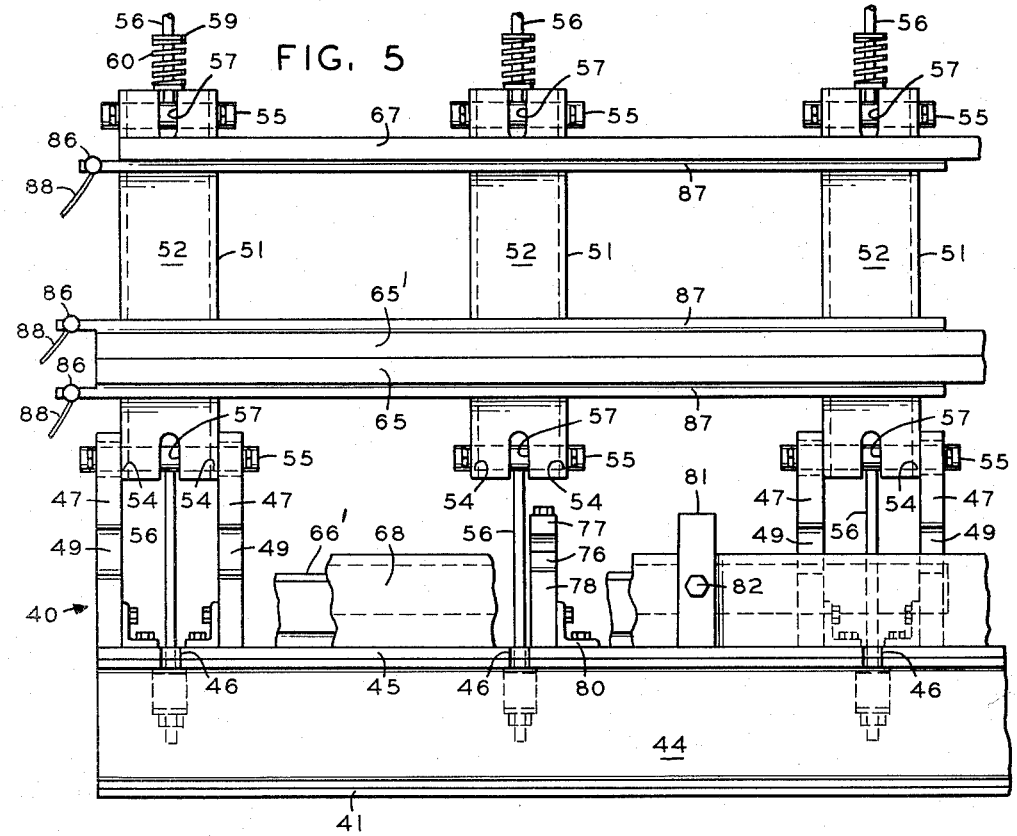
FIGURE 5 is a rear edge view of a fixture used for adhering such an airfoil together, the rear or trailing edge of the fixture being shown opened hingedly upward.
Figure 6:
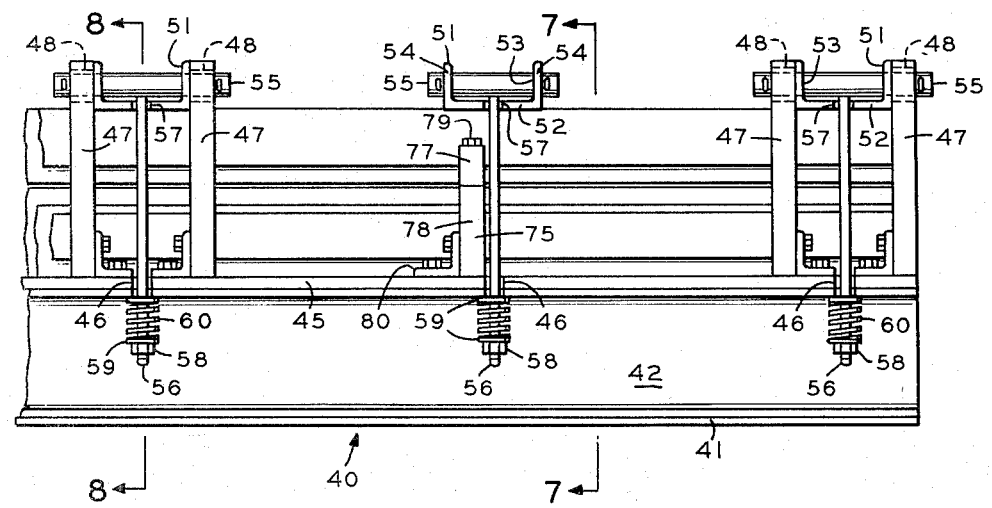
FIGURE 6 is a view of the front edge of such fixture, shown fragmentarily, the rear edge being closed.
Figure 8:
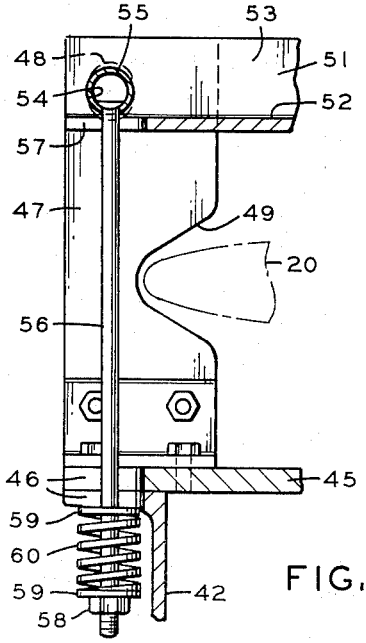
FIGURE 8 is a fragmentary sectional view taken along line 8—8 of FIGURE 6.

The bonding fixture 40 may consist of a simple base plate 41, three upright supporting channels 42, 43, 44 (so numbered from leading edge to trailing edge) topped by heavy horizontal bed plate 45, all extending the full length of the fixture 40, which is slightly longer than the blade to be formed. The upper flanges of the forward support channel 42 and rear support channel 44 and the forward and rear edges of the horizontal bed plate 45 thereof have chordwise slots 46, most clearly shown in the leading edge view FIGURE 6 and the trailing edge view FIGURE 5. Along the leading edge side, as shown in FIGURE 6, are a plurality of spaced rigid upright yoke supports 47, whose upper ends have vertically elongated slotted holes 48. Near its mid-height, each of the upright yoke supports 47 has a clearance indentation 49 to receive the leading edge of the spar 20 as shown in FIGURE 8.

Co-operating with these fixed elements is a floating framework. It consists of a plurality of spaced floating frame channels 51, extending chordwise across the fixture. Each has a horizontal web 52, from which flanges 53 project vertically upward. At both ends the channel flanges 53 are penetrated by aligned spanwise bores 54 in which are journalled the upper shaftlike portions 55 of T-bolts 56. The forward and aft ends of the channel webs 52 have slots 57 aligned with the slots 46 beneath them; and the remote ends of the T-bolts 56 are threaded and equipped with nuts 58, washers 59, and compression springs 60. The shaft-like portions 55 of alternate T-bolts along the leading edge of the fixture (as shown in FIGURE 6) are accommodated within the vertically-elongated slotted holes 48 in the upright yoke members 47. These permit the precise height of the floating frame channels 51 above the horizontal bed plate 45, to be determined by the setting of pressure-applying members against the blade parts being joined.

Pressure to the joints to be adhered is applied both in the region of maximum blade thickness and along the rear margins 13, by suitably contoured full-span steel pressure bars. These are: the upper forward pressure bars 65, 65'; the forward lower pressure bars 66, 66'; the upper rear pressure bar 67 and the lower rear pressure bar 68. The upper pressure bars 65, 65' and 67 are welded or otherwise firmly attached to each of the floating frame channels 51; they join the channels 51 much in the manner that the rails of a ladder join its steps, (as will be apparent from the upper portion of FIGURE 5) with the ends of the channels 51 projecting. The lower pressure bars 66, 66', 68 are welded along the upper surface of the horizontal bed plate 45 directly beneath the corresponding upper pressure bars. The inner edge surface of each of the pressure bars (that is, the surfaces presented to contact the blade being adhered together) are contoured to fit the outer side of the airfoil mold line. Thus, the upper forward pressure bars 65, 65' have inner edges 69, 69' so contoured that together they present a concave curvature fitting precisely to the convex curvature of the airfoil to be formed in the region where pressure is to be applied (substantially at maximum thickness region of the airfoil, as shown). Partly because of the concavity of the curvature, they are more readily formed as two separate bars 65, 65' than as a single bar; but the substitution of a single bar of substantially the same total chordwise width would be obvious. Corresponding curvature is provided along the inner edges 70, 70' of the lower forward pressure bars 66, 66'. As shown, the combined width is slightly greater than the chordwise width of the upper and lower adhesion faces 23 of the spar 20; hence, firm pressure is furnished along the entire joint to be adhered. Assuming that the airfoil is to have twist, the curvature of the inner edges 69, 69', 70, 70' will be rotated with the blade twist from the position shown in the double phantom lines to the twisted position shown in the single phantom line of FIGURE 7. Such twist will result in marked change of height and slope of the rear skin margins 13 when they are pressed together as shown in FIGURE 7. This change in height and slope is illustrated at the right side of FIGURE 7, showing how the inner edges of the upper rear pressure bar 67 and lower rear pressure bar 68 vary to accommodate the airfoil twist.

Fitting the parts to be adhered together—the upper and lower skins 11, 12 and the spar 20—is achieved principally by the pressure bars 65–68 as described. For greater certainty of precise joining, especially where the airfoil is twisted along its span, leading edge and trailing edge stops are also provided. Midway in the spacing between the successive pairs of upright yoke members 47 are shown leading edge stops generally designated 75, formed conveniently in two pieces which together present a leading-edge-abutting cutout generally designated 76. The two members of each leading edge 75 as shown are an upper leading edge stop member 77 and a lower leading edge stop member 78, secured together by a bolt 79, the lower member being mounted on the horizontal bed plate 45 by a bolted angle 80 or other convenient means. The level of juncture of the upper and lower stop members 77, 78 may be varied along the span, to reflect the effect of twist, as shown at the left side of FIGURE 7; and level and angle at which the cutout 76 is presented may thus be appropriately modified.

Trailing edge stops may also be helpful, especially in a twisted blade, to assure that the forward edges of the skins 11, 12 are kept firmly pressed forward against the shoulders 24. A plurality of vertical trailing edge stop bars 81 are attached at convenient intervals by bolts 82, through spacers 83, to the lower rear pressure bar 68. The stop bars 81 extend upward from the bed plate 45 to a level slightly above the level at which the inner edges 71, 72 of the rear pressure bars establish the joint of the rear margins 13.

In order to heat the bonding fixture (when using heat-curing adhesives) strip heaters 86 are attached spanwise along an open side of each of the pressure bars 65, 65', 66, 66', 67, 68. Each of these heaters 86 has a buss bar 87 connected through a lead 88 in an electrical circuit with a source of current, not shown. Such strip heaters are familiar. Leads to the upper strip heaters 86 are indicated in the drawing, FIGURE 5 at their left ends; other end connections and connections to lower heaters 86 are similarly made.

In order to use the bonding fixture 40, the spar adhesion faces 23 and shoulders 24 are coated with an appropriate heat-curable, high strength adhesive; a relatively rigid adhesive such as an epoxy is preferred over rubber-base adhesives. The inner surfaces of the rear skin margins 13 are similarly coated with the adhesive. With the fixture open as shown in FIGURE 5, the spar 20 and skins 11, 12 are laid into position, the leading edge of the spar 20 being inserted in the stop cutout 76 and the skins 11, 12 pressed forward against the spar shoulders 24, their rearward edges abutting the forward surfaces of the trailing edge stop bars 81. The floating frame channels 51 are then folded to horizontal position, the upper pressure bars 65, 65', 67 being brought into pressure-applying position as shown in FIGURE 7. The T-bolts 56 are swung through the upper and lower slots 57, 46; and the nuts 58 are tightened against the compression of the springs 60 to draw the floating frame channels 51 downward. The vertically-elongated slotted holes 48 in the upright yoke members 47 permit a sufficient degree of travel to take up slack; if a torque wrench is used to tighten the nuts 58, the pressures applied by the inner edges 69, 69', 70, 70', 71, 72 of the pressure bars can be carefully controlled. The strip heaters 86 are then energized to apply heat through the pressure bars to the joints to be cured (if a room-temperature curing adhesive is used, this will not be necessary). Any yielding due to the flow of the adhesive is compensated for by a slight extension of the compression springs 60, without substantial loss of pressure. The result is the airfoil whose segment is shown in FIGURE 3, whose forward skin margins are adhered in contour-conforming alignment to the contoured-recessed spar faces 23 and whose rear margins are adhered firmly to each other in flatwise, load-transferring contact. The skins between the spar and the adhered rear skin margins are bent only elastically, but yet have good airfoil afterbody shape.

Figure 4:
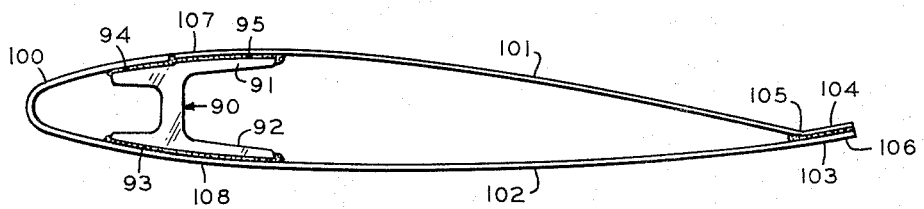
FIGURE 4 is a sectional view of an alternate embodiment of the present invention, showing an unsymmetrical reflex airfoil.

A modified embodiment, likewise of value for helicopter rotor blade construction although capable of other use as an airfoil, is shown in FIGURE 4. In it the principal differences are: the spar is hollow, formed of an aluminum extrusion generally designated 90 and a steel plate leading edge 100, adhered together at the time of bonding with the afterbody skins; the afterbody skins or of unequal thickness, the upper skin 101 being in this case thinner than the lower skin 102; and only the upper skin 101 has a permanently set angular bend adjacent to its trailing edge. The result is an unsymmetrical airfoil with an upwardly reflexed trailing edge cusp 103. This embodiment will now be examined in greater detail.

An extruded aluminum spar generally designated 90, which somewhat resembles an H-beam, has an upper flange 91 and a lower flange 92 which support both a steel leading edge plate 100 and upper and lower aluminum afterbody skins 101, 102. The lower flange 92 has an outer face 93 recessed within the airfoil mold line and extending parallel to it, aft to the region of maximum airfoil thickness. The upper flange 91 has a somewhat similar forward face portion 94 which supports the leading edge plate 100; aft of which the upper flange 91 juts slightly outward and then continues, parallel to and recessed within the airfoil mold line but somewhat closer, to provide an aft face portion 95.

The preferably steel leading edge plate 100 and the preferably aluminum lower skin 102 are shown here to be of equal thickness. The aluminum upper skin 101 is of thinner gauge. After being adhered to the upper aft face portion 95, the outer surface of the upper skin 101 is substantially at the airfoil mold line. The actual difference in thickness between the upper skin 101 and the lower skin 102 is not great; for instance, if the lower skins be .040 inch thick, the upper skins may be .032 inch thick. To "reflex" the trailing edge, as illustrated in FIGURE 4, the upper skin 101 has a rear margin 104 demarked forwardly by a permanently-set angular bend 105, whose angularity may conveniently be approximately double the amount of the permanently set angular bends 14 of FIGURE 1. The corresponding aft marginal portion 106 of the lower skin 102 is left flat prior to the bonding operation; the angularity of the juncture of the skins 101, 102 is provided entirely by the bend 105 in the upper skin 101.

The steps of bonding will proceed substantially as has heretofore been described, the leading edge plate 100 and the spar 90 being bonded together simultaneously with the bonding of the skins 101, 102. In the construction of FIGURE 4, the aft projecting edges of the leading edge plate 100 serve the same purpose as the aft shoulders 24 of the spar 20 in the FIGURE 3 construction.

When the bonding fixture clamps the parts together, the forward margins 107, 108 of the skins 101, 102 are elastically bent to contour-conforming relationship with the spar's aft flange portions 95, 92. The rear margin 104 of the upper skin 101 is pressed together with and adhered to corresponding marginal portion 106 of the lower skin 102, as the aft-projecting flange portions of the spar 90 hold the skins 101, 102 spread apart, just as in the embodiment of FIGURE 3.

Unsymmetrical curvature—that is, greater curvature of the upper skin 101 as compared to the lower skin 102—results entirely from the fact that the upper skin is of lesser thickness. The elastic stresses imposed by the constraints of the skin margin are reacted through the upper and lower skins 101, 102 in opposition to each other, resulting in more curvature of the thinner upper skin 101. If the marginal constraints offered by the adhesive material should fail, the skins 101, 102 would return to flatness as before bonding.

If a typical cusped, cambered airfoil was desired, the upper skin 101 might have been left flat at its aft edge and all the angular convergence at the cusp furnished by a preliminarily "set" angular bend given to the aft marginal portion of the lower skin.

Skins which are bent elastically to predetermined marginal constraints are thus given curvatures which are not subject to "springback" and related manufacturing deviations. Repair is especially easy. Fatigue life is not impaired by forming processes; and the absence of ribs also contributes to freedom from fatigue difficulties. Tooling expense is minimized and manufacturing is speeded.

In the claims the term "unsupported" does not preclude the use of end closures.

Other variations will occur to those familiar with the problems of fabricating airfoils, and particularly with the problems inherent in the construction of helicopter rotor blades. Accordingly, this invention is not to be considered narrowly, but rather as fully co-extensive with the claims which follow.

I claim:

1. An airfoil of the type having upper and lower aft skins unsupported between a spar and a trailing edge juncture of said skins, comprising a spar having convex airfoil-contour-conforming faces recessed within the outer contour of the airfoil adjacent and extending to the spar edge and terminating in spreader ends, together with upper and lower aft skins having forward margins adhered to said recessed faces and, by such adherence, constrained elastically stressed from flat to contour-conforming alignment with said faces, whereby convexity of curvature is imposed on the forward skin margins, said aft skins having adhered-together rear margins demarked forwardly by a permanently-set angular bend and demarked rearwardly by the trailing edge line, said angular bend being at such angle as to so space the forward margins that the spreader ends impose upon them outward thrust, whereby such convexity of curvature is reduced progressively aft, whereby a cusp-like trailing edge juncture is formed across which elastic stresses in each of the upper and lower skins are transmitted to the other of said skins and resisted by it, the margin constraints thus imposed on said upper and lower skins holding them elastically in the conformation of an airfoil afterbody characterized by convexity of curvature decreasing from the spar to the trailing edge juncture.

2. A symmetrical airfoil of the type having upper and lower aft skins unsupported between a spar and a trailing edge juncture of said skins, comprising a spar having convex symmetrical airfoil-contour-conforming faces recessed within the outer contour of the airfoil adjacent and extending to the spar edge and terminating in spreader ends, together with upper and lower aft skins of equal thickness having forward margins adhered to said recessed faces and, by such adherence, constrained elastically stressed from flat to contour-conforming alignment with said faces, whereby convexity of curvature is imposed on the forward skin margins, said aft skins having adhered-together rear margins demarked forwardly by a permanently-set angular bend, equal in each skin, and demarked rearwardly by the trailing edge line, said angular bend being at such angle as to so space the forward margins that the spreader ends impose upon them outward thrust, whereby such convexity of curvature is reduced progressively aft, whereby a cusp-like trailing edge juncture is formed across which elastic stresses in each of the upper and lower skins are transmitted to the other of said skins and resisted by it, the margin constraints thus imposed on said upper and lower skins holding them elastically in the conformation of a symmetrical airfoil afterbody characterized by convexity of curvature decreasing from the spar to the trailing edge juncture.

3. A reflex airfoil of the type having upper and lower aft skins unsupported between a spar and a trailing edge juncture of said skins, comprising a spar having convex airfoil-contour-conforming faces recessed within the outer contour of the airfoil adjacent and extending to the spar edge and terminating in spreader ends, together with upper and lower aft skins having forward margins adhered to said recessed faces and, by such adherence, constrained elastically stressed from flat to contour-conforming alignment with said faces, whereby convexity of curvature is imposed on the forward skin margins, the upper skin being of thinner gage, said aft skins having adhered-together rear margins demarked forwardly by a permanently-set angular bend in said upper skin and demarked rearwardly by the trailing edge line, said angular bend being at such angle as to so space the forward margins that the spreader ends impose upon them outward thrust, whereby such convexity of curvature is reduced progressively aft, whereby a cusp-like trailing edge juncture is formed across which elastic stresses in each of the upper and lower skins are transmitted to the other of said skins and resisted by it, the margin constraints thus imposed on said upper and lower skins holding them elastically in the conformation of an airfoil afterbody in which the upper skin has greater curvature and the trailing edge is reflexed upward characterized by convexity of curvature decreasing from the spar to the trailing edge juncture.

4. A twisted airfoil of the type having upper and lower aft skins unsupported between a spar and a trailing edge juncture of said skins, comprising
- a spanwise-twisted spar having convex airfoil-contour-conforming faces recessed within the outer contour of the airfoil adjacent and extending to the spar edge and terminating in spreader ends,
- together with upper and lower full-span aft skins having forward margins adhered to said recessed faces and, by such adherence, constrained elastically stressed from flat to contour-conforming and twist-conforming alignment with said faces, whereby convexity of curvature is imposed on the forward skin margins,
- said aft skins having rear margins adhered together at such spanwise offset as results from the twist,
- said adhered together rear margins being demarked forwardly by a permanently-set angular bend, at such angle as to so space the forward margins that the spreader ends impose upon them outward thrust, whereby such convexity of curvature is reduced progressively aft,
- whereby a trailing edge juncture is formed across which elastic stresses in each of the upper and lower skins are transmitted to the other of said skins and resisted by it,
- the margin constraints thus imposed on said upper and lower skins holding them elastically in the conformation of a twisted airfoil afterbody characterized by convexity of curvature decreasing from the spar to the trailing edge juncture.

References Cited in the file of this patent

UNITED STATES PATENTS

| | | |
|---|---|---|
| 2,021,470 | Upson | Nov. 19, 1935 |
| 2,399,828 | Roche | May 7, 1946 |
| 2,467,031 | Hess | Apr. 12, 1949 |
| 2,535,917 | Gruetjen | Dec. 26, 1950 |
| 2,568,230 | Gluhareff | Sept. 18, 1951 |
| 2,596,818 | Meyers | May 13, 1952 |
| 2,620,884 | Gluhareff | Dec. 9, 1952 |
| 2,669,313 | Lightfoot | Feb. 16, 1954 |
| 2,754,915 | Echeverria | July 17, 1956 |
| 2,767,461 | Lebold | Oct. 23, 1956 |
| 2,828,531 | Bath | Apr. 1, 1958 |
| 2,889,615 | Stalker | June 9, 1959 |
| 2,941,603 | Jovanovich | June 21, 1960 |
| 2,950,766 | Huber | Aug. 30, 1960 |
| 2,955,662 | Bonnett | Oct. 11, 1960 |
| 3,000,446 | Warnken | Sept. 19, 1961 |

FOREIGN PATENTS

| | | |
|---|---|---|
| 1,009,798 | France | Mar. 12, 1952 |
| 352,507 | Great Britain | July 10, 1931 |
| 439,407 | Great Britain | Dec. 5, 1935 |
| 588,112 | Great Britain | May 14, 1947 |